March 25, 1958  R. V. EDDS  2,827,724
METHOD AND APPARATUS FOR DETERMINING ETCHING DEPTH
Filed March 7, 1955  3 Sheets-Sheet 1
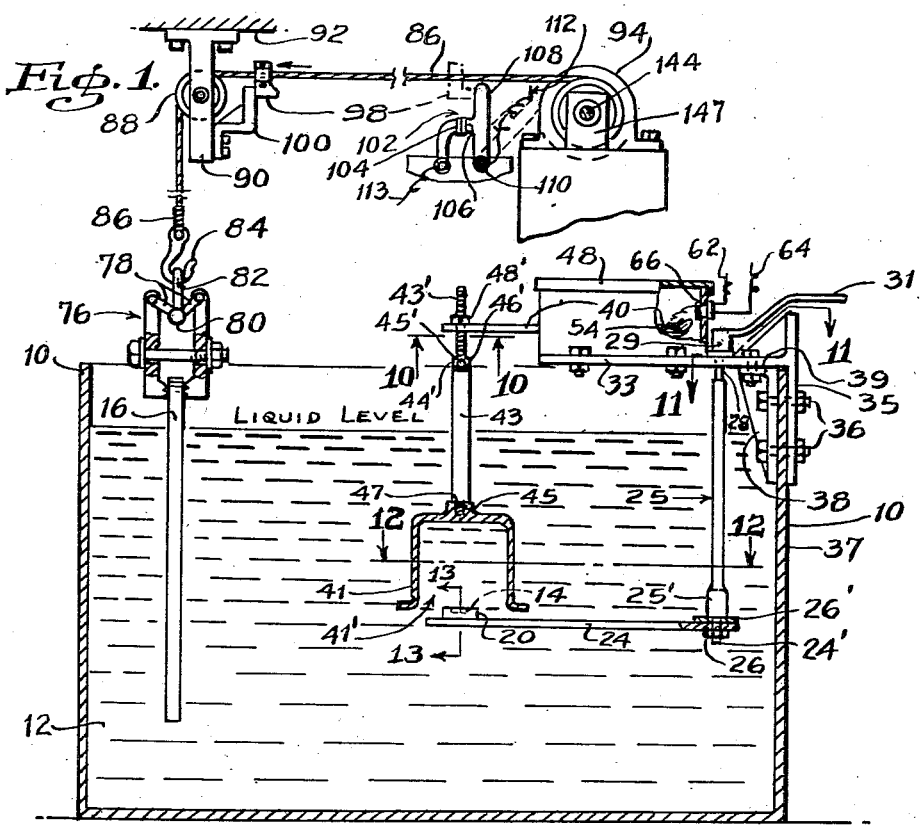
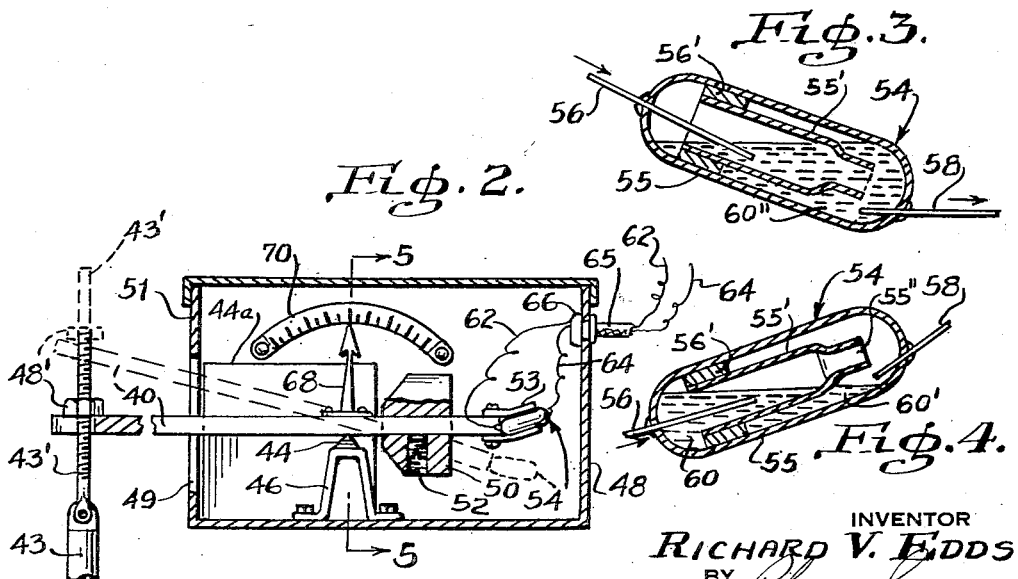
INVENTOR
RICHARD V. EDDS
BY
ATTORNEY March 25, 1958   R. V. EDDS   2,827,724
METHOD AND APPARATUS FOR DETERMINING ETCHING DEPTH
Filed March 7, 1955   3 Sheets-Sheet 2
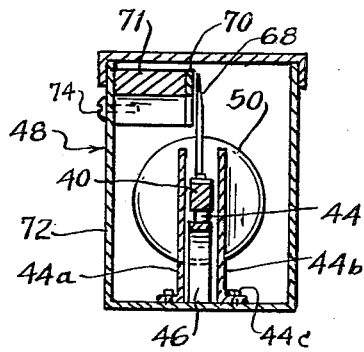
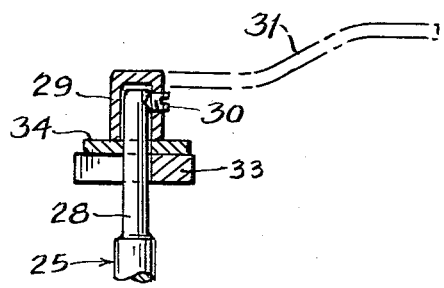
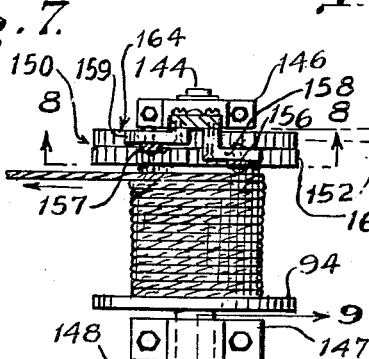
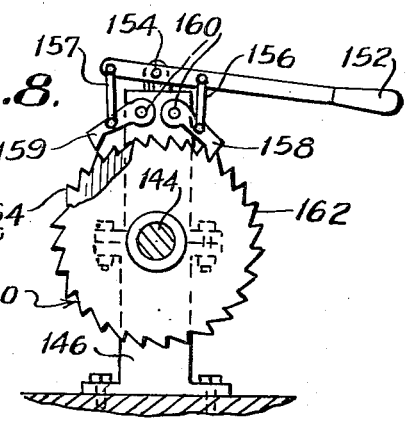
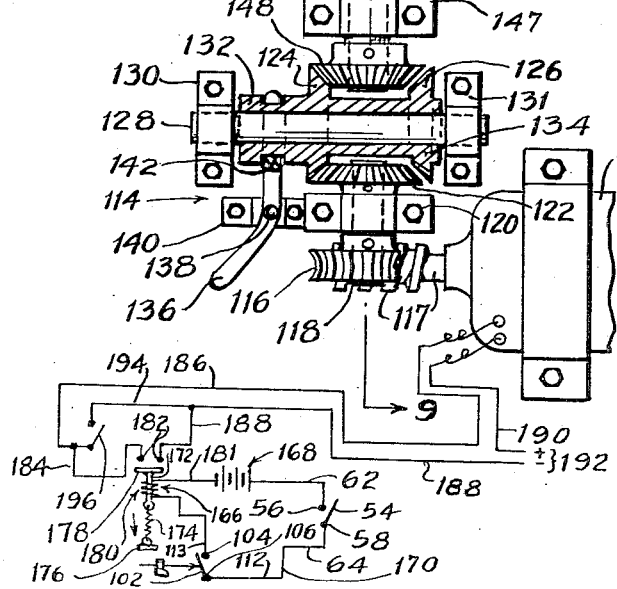
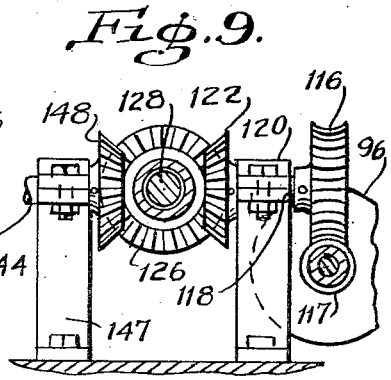
INVENTOR
RICHARD V. EDDS
BY
ATTORNEY.

March 25, 1958　　　　R. V. EDDS　　　　2,827,724
METHOD AND APPARATUS FOR DETERMINING ETCHING DEPTH
Filed March 7, 1955　　　　　　　　　　3 Sheets-Sheet 3
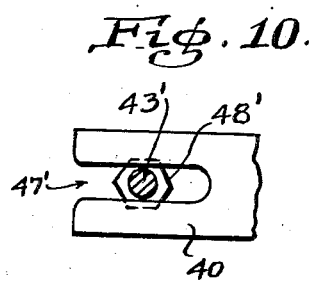
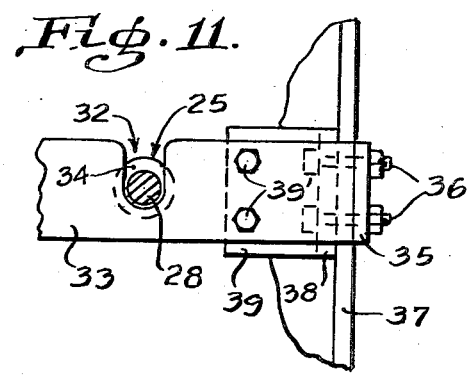
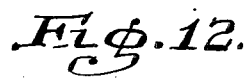
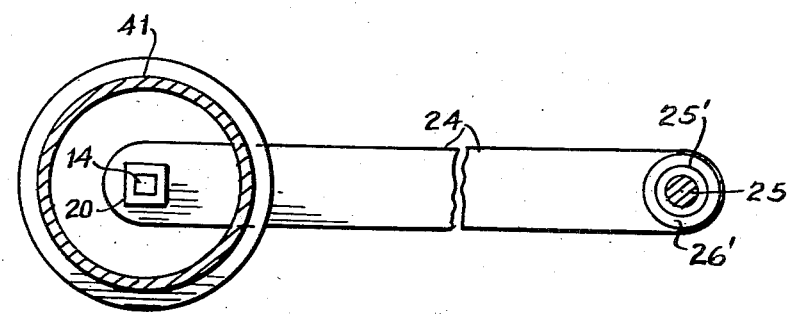
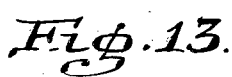
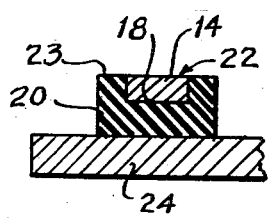
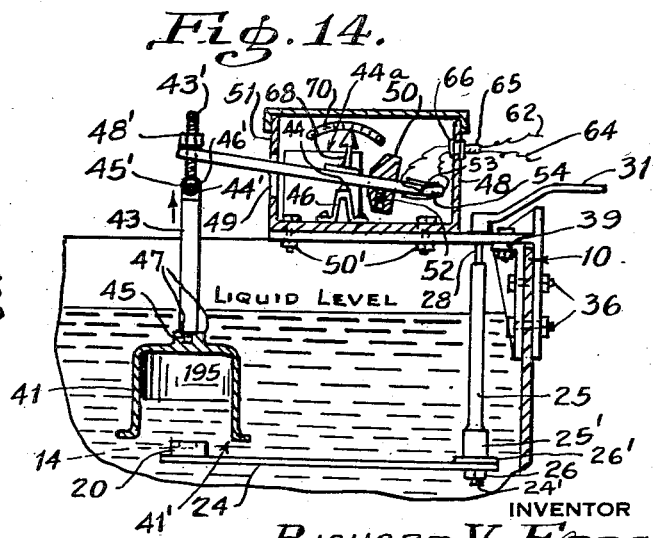
INVENTOR
RICHARD V. EDDS
BY
ATTORNEY.

United States Patent Office 2,827,724
Patented Mar. 25, 1958

2,827,724

METHOD AND APPARATUS FOR DETERMINING ETCHING DEPTH

Richard V. Edds, Los Angeles, Calif., assignor to Turco Products, Inc., Los Angeles, Calif., a corporation of California Application March 7, 1955, Serial No. 492,710

14 Claims. (Cl. 41—9)

This invention relates to ascertaining or monitoring attainment of a predetermined depth of etch in a work piece undergoing chemical etching or milling. The invention is particularly concerned with a method and device for sensing and signalling that a desired amount of etching has taken place in an etched work piece, followed by withdrawal of the work piece from the etching solution.

According to conventional practice, the etching of various materials has been controlled either on a straight time basis or by periodically removing the part to physically measure the remaining thickness. These methods are disadvantageous in that the first method does not take into consideration changes in the etching rate which accompany a relatively long-term etching process, and the second method is wasteful of time and accuracy due to the periodic removal of the work from the bath. When a number of parts are in a bath, the latter method easily causes confusion, especially since the bath characteristics may vary without recognition or knowledge thereof by the operator. These problems are of particular importance when close tolerances are required in the etched member.

One object of this invention is to provide a method and apparatus for determining or monitoring etching depth.

Another object is the provision of a method and apparatus for determining the amount that a work piece has been chemically milled.

A still further object of the invention is to provide a method and apparatus of monitoring the attainment of a predetermined etching depth.

Still another object of the invention is the provision of a method and apparatus for attaining a predetermined depth of chemical etch on a work piece, including electrical, mechanical, or electromechanical sensing associated with a sample piece subjected to the same etching action as the work piece, for indicating attainment of said predetermined depth.

A still further object is the provision of a method and apparatus as set forth above, and further providing for removal of the etched work piece from contact with the etching solution on attainment of a predetermined depth of etch on said work piece, and in response to said sensing of the action of the etching solution on said sample piece.

Yet another object is to provide a method and apparatus for obtaining a predetermined depth of metal removal from the surface of a metal work piece by chemical etching.

Other objects and advantages of the invention will appear hereinafter.

The instant invention is based on the principle that when an article forms a gas on reaction with an etching solution in which said article is being etched, the quantity of gas so generated or evolved is proportional to the amount of material dissolved from said article, or the weight loss of the article during etching. Thus, according to the invention, the attainment of a desired or predetermined depth of material removal from such an article subjected to chemical etching in an etching solution can be indicated by exposing a predetermined area of said article to etching treatment, and etching the exposed area for a period sufficient to generate a preselected amount of the gas corresponding to the desired predetermined depth of material removal. To determine when said preselected amount of gas has been evolved, the gas can be collected and when the requisite quantity of gas has been collected, this condition is sensed or signalled to indicate that the desired depth of etch has been reached. In response to this signal, the article itself can be removed from the solution or some other action initiated which depends on or is related to the attainment of such predetermined depth of etch.

Thus, where it is desired to etch a work piece to a predetermined depth, and particularly where such work piece has an irregular surface, a sample of the same material as such work piece, and having a predetermined area exposed for etching can be placed in the etching solution along with and adjacent to the work piece to be etched in said solution. The work piece and sample are etched under substantially the same conditions in the etching bath. When a preselected amount of gas is evolved or collected from the sample corresponding to a predetermined depth of material removal therefrom, the work piece will then be etched to this same desired predetermined depth. Such quantity of gas generated is sensed and this serves as a signal to actuate a desired action on the work piece being processed, such as removal thereof from the etching solution. In the latter case a mechanism can be triggered for removing the work piece from the solution. Hence, the work piece is withdrawn from the etching solution practically immediately on attainment of the desired amount or depth of etching thereof.

More specifically, in one mode of carrying out the invention a sample piece of the same metal as a work piece to be chemically etched, and which metal evolves a gas in the etching reaction, is placed on a support or platform. Preferably, I employ as the sample piece a metal having the same chemical composition and physical properties as the metal of which the work piece is composed. The work piece is independently supported for movement into and out of the etching solution by a cable operated by a motor. A predetermined area of the sample piece is exposed for etching and the sample and work piece are placed in the etching solution in proximity to each other.

A container is positioned in the etching solution above the sample support and the sample positioned thereon, the container having an opening therein for the introduction of gas evolved from the sample during the etching reaction. This container, which can be in the form of a bell, is supported at one end of a pivoted beam which is counterweighted. The counterweight on the beam is so positioned therealong to offset the buoyancy of the gas collected in said container, that when a quantity of gas is so collected corresponding to a predetermined depth of material etched from the sample, which depth of etch will be the same as that produced on the work piece, any additional gas collected will cause the beam to rotate sufficiently to actuate a sensing device.

The sensing device can be a switch mounted at the other end of said beam from the container. The switch operates to close a circuit to the motor, which in turn operates the cable from which the work piece is supported, lifting said work piece out of the etching solution. Since the switch and motor operate almost instantaneously to remove the work piece from the etching solution on pivotal motion of the beam which supports the container, the work piece will be etched on all its exposed surfaces to a depth substantially equal to the predetermined depth of etch of the sample at the time of actuation of the beam.

The invention will be more readily understood from the following description of a preferred embodiment of the invention, taken in connection with the accompanying drawings, wherein:

Fig. 1 is a sectional view in elevation of my device, shown in operative position for etching a work piece to a predetermined depth;

Fig. 2 is a view in elevation of the mechanism for supporting the bell and including the supporting beam therefor and the sensing means or switch associated with said beam;

Fig. 3 is a detail view of the sensing means or switch in its operative position;

Fig. 4 is a view similar to Fig. 3, showing the switch in an inoperative position;

Fig. 5 is a section taken on line 5—5 of Fig. 2;

Fig. 6 is an enlarged elevation, partly in section, showing certain structural details of the device shown in Fig. 1;

Fig. 7 is a plan view of the motor and pulley for operating the cable to which the work piece is attached, and including a schematic illustration of a circuit employed in the operation of the motor;

Fig. 8 is a section taken on line 8—8 of Fig. 7;

Fig. 9 is a section taken on line 9—9 of Fig. 7;

Fig. 10 is a view taken on line 10—10 of Fig. 1, showing the manner of attachment to the end of said beam of the support for the bell;

Fig. 11 is a section taken on line 11—11 of Fig. 1;

Fig. 12 is a sectional view taken on line 12—12 of Fig. 1;

Fig. 13 is a section taken on line 13—13 of Fig. 1; and

Fig. 14 is a view in elevation of a portion of the device shown in Fig. 1, with the bell and the supporting beam therefor shown in a different position from that shown in Fig. 1.

Numeral 10 represents a tank containing an etching solution 12 which may be either of the acid or alkaline type depending on the particular metal or material being etched. Where aluminum or its alloys are to be etched, the etching treatment is carried out in an aqueous solution containing an alkali such as sodium or potassium hydroxide, trisodium phosphate, sodium carbonate or the like, or mixtures thereof. Concentration of the alkali etching solution can be in the range of 0.1 to 10 normal. Temperature of the solution may range say from room temperature, for example, 60° to 70° F., to about 212° F. Generally, a hot solution is employed, with temperature maintained in a range from about 140° F. to about 210° F. during treatment.

A sample piece of metal 14 (see Figs. 1, 12, and 13) of the same material as a work piece 16, e. g., of aluminum, which is to be etched to a predetermined depth according to the invention, is inserted in a cavity or aperture 18 of a test block or holder 20. In this manner, only one surface 22 of the work piece (see particularly Fig. 13) is exposed for attack by the etching solution. The body of holder 20 is constructed of a material, e. g., rubber or plastic, which resists attack by the etching solution. The sample piece 16 has substantially the same length, width, and depth as aperture 18, and fits snugly therein with the exposed surface 22 flush with the upper surface 23 of the holder, so that the sample piece will not be dislodged from such aperture during the etching treatment. It will be understood, of course, that sample pieces having a shape different from the sample piece 14 shown, e. g., circular, can be used, and the aperture 18 shaped accordingly to receive said sample piece. Further, if desired, means other than that illustrated may be utilized to support the sample piece in the solution so that only a certain desired surface area thereof is exposed to the action of the etching solution.

The holder 20 is positioned on an elongated platform 24 near one end thereof, and is supported at the other end thereof in the etching solution by the rod 25 which is connected at its lower end to the other end of the platform by means of a nut 26 which fits over a reduced lower portion 24' of rod 25. The rod 25 has a shoulder 25', the lower end of which rests on a washer 26' positioned on the platform 24 and through which the reduced end 24' of the rod passes, the platform 24 thus being clamped between nut 26 and washer 26'. The reduced upper end 28 of rod 25 receives a sleeve member 29 (see also Fig. 6) which is fixed to such upper end 28 by a set screw 30, said sleeve member having one end of a handle 31 integrally attached thereto for manipulating rod 25 and platform 24. The upper reduced portion 28 of rod 25 is received in a notch 32 (see Fig. 11) of a beam 33 for supporting said rod, and the lower end of sleeve member 29 rests on a washer 34 positioned on beam 33, said washer receiving the upper reduced end 28 of the rod. The beam 33 has an integral vertical bracket 35 at one end thereof, the bracket being connected by bolt and nut assemblies 36 to the upper portion of a wall 37 of the tank, said bolt and nut assemblies also fastening a second bracket 38 to the inner surface of tank wall 37. Bracket 38 has a horizontal upper portion 39 which is connected to beam 33 by bolt and nut assemblies 39' to lend further support to said beam.

A bell 41 having an open end 41' facing downward is supported directly above the holder 20 and sample piece 14 therein so that gas evolved from the piece during the etching reaction rises into the bell and is captured in the upper closed end thereof. The upper closed end of the bell is connected to the lower end of a rod 43 by means of a stud 45 attached to said rod and passing into a central boss 47 at the top of the bell. A screw 43' for supporting rod 43 has an eye 44' at its lower end, which receives a pin 45' attached to a bracket 46' which is integral with the upper end of rod 43. The screw 43' is received in a notch 47' at the end of a beam 40, and the assembly including rod 43 and bell 41 is supported from beam 40 by means of an adjustable nut 48' on screw 43' and in contact with the upper surface of beam 40.

The beam 40 is fulcrumed intermediate its ends on a knife edge 44 (see Figs. 2 and 14) positioned on a support 46 contained in a housing 48, said support being bolted to the bottom of said housing which is in turn connected to the beam 33 by bolt and nut assemblies 50' passing through the bottom of said housing. The beam 40 is positioned between vertical guide plates 44a and 44b (see Fig. 5) connected by bolts 44c to the bottom of housing 48, and passes through a vertical slot 49 in end wall 51 of housing 48, permitting pivotal movement of said beam in a vertical plane. A counter-weight 50 is adjustably positioned along the beam 40 on the other side of the knife edge from the screw 43', by means of a set screw 52. The counterweight 50 can be adjusted along beam 40 to permit immersion of the bell 41 in the solution, and during etching treatment to permit a preselected amount of clockwise rotation of the beam 40, as viewed in Fig. 14, when a predetermined amount of gas generated in etching is collected in the bell 41, as described more fully hereinafter. A mercury switch 54 is connected by a support 53 to the end of beam 40 adjacent the counterweight 50, said switch having a non-conductive envelope 55 (see Figs. 3 and 4) containing two electrodes 56 and 58 at opposite ends of the envelope and an internal insulating sleeve 55' supported within the envelope by an insulating annular ring 56' between said sleeve and the envelope. Within the envelope is mercury, which, when the envelope 55 is in the position shown in Fig. 4, is separated into two bodies of mercury 60 and 60' by the insulating ring 56'. Electrical leads 62 and 64 are connected to electrodes 56 and 58, and such leads, protected by insulation 65, are connected through a plug 66 in the wall of housing 48, in an electrical circuit described below.

It is seen that switch 54 is tilted upwardly at an angle to the axis of beam 40. Thus, when the beam is in a horizontal position as seen in Figs. 1 and 2, or when the beam is pivoted to lower the left end thereof supporting the bell 41 while raising the right end of the beam including switch 54, the switch will be in the inoperative open position shown in Fig. 4, with the two bodies of mercury 60 and 60' separated. But when the beam 40 is pivoted clockwise to raise the left end thereof and lower the right end including switch 54 a certain amount, the switch is in its operative closed position as illustrated in Fig. 3, since the two bodies of mercury 60 and 60' are now joined to form a single continuous body of mercury 60" by passage of the body of mercury 60 through the open end 55" of sleeve 55', said single body of mercury 60" being in contact with both electrodes 56 and 58. A pointer 68 is connected to the beam 40 in vertical alignment with the knife edge 44, pointer 68 moving along a calibrated scale 70 to visually gage the extent of pivotal movement of the beam 40, said scale being connected to an arcuately shaped support 71 (see Fig. 5) in turn attached to a side wall 72 of the housing 48 by means of screws 74.

The work piece 16 is supported for movement into and out of the body of etching solution in tank 10 by a clamp 76 (see Fig. 1) making contact with the opposite sides of the work piece at the upper portions thereof, and frictionally gripping the work piece. The clamp 76 has a pair of articulating links 78 pivotally connected at their adjacent inner ends; and to their pivot pin 80 is attached a supporting ring 82 which is received by a hook 84 connected to the end of a cable 86. The cable passes over a pulley 88 supported on a bracket 90 bolted to the ceiling 92 or an overhanging structural member. The cable is wound and unwound from a pulley 94 (see also Fig. 7) operated by a motor 96; and cable 86 has attached thereto a stop 98 which moves between the pulleys 88 and 94.

Bracket 90 has an arm 100 connected thereto which makes contact with the stop 98 on the cable, to prevent further unwinding of the cable from pulley 94, and further lowering of the work piece in the solution. A switch 102 is provided adjacent pulley 94, said switch comprising a fixed contact 104 and a movable contact 106 mounted on an arm 108 which is pivoted at 110 for clockwise movement to separate the contacts and open the switch. Such pivotal clockwise movement of switch arm 108 takes place on contact of the upper portion of arm 108 by stop 98 as the latter moves past the switch 102 toward pulley 94 when the cable is wound thereon.

Switch 102 is connected in the circuit described below by leads 112 and 113. When the switch arm 108 is in the full line position shown in Fig. 1, there is provided sufficient friction at the pivot 110 to maintain the contacts 104 and 106 engaged.

Motor 96 operates pulley 94 through a speed reducing and reversing system 114. This system is composed of a gear 116 driven by a worm 117 on the motor drive shaft, said gear being mounted on a shaft 118 supported in a bearing 120. A bevel gear 122 is fixedly mounted at the other end of shaft 118 for rotation therewith, and meshes either with the bevel gear 124 or bevel gear 126, both of which are mounted for rotation on a shaft 128 positioned normal to shaft 118 and journalled at its opposite ends in bearings 130 and 131. Shaft 128 and the gears 124 and 126, mounted thereon, are axially movable, the shaft 128 having stop members 132 and 134 positioned thereon, adjacent gears 124 and 126, for abutment with the bearings 130 and 131 to limit said axial movement.

A lever 136 is pivotally mounted on a pivot pin 138 connected to a bracket 140, the end of the lever being positioned in a notch 142 provided in the stop member 132.

Pulley 94 is mounted on a shaft 144 which is journalled at its opposite ends in bearings 146 and 147. The shaft 144 is in axial alignment with shaft 118, and shaft 144 has a bevel gear 148 mounted on its inner end and adapted to engage either bevel gear 124 or bevel gear 126. It is seen that when lever 136 is pivoted clockwise, it will displace shaft 128 and gears 124 and 126 to the right to bring bevel gear 124 into engagement with gears 122 and 148, as seen in Fig. 7; and, assuming clockwise rotation of gear 122 by the motor, gear 148 and pulley 94 will rotate counterclockwise to unwind the cable 86 from said pulley, as seen by the arrow in Fig. 7. When lever 136 is pivoted counterclockwise, this action will displace shaft 128 and gears 124 and 126 to the left, bringing bevel gear 126 into engagement with gears 122 and 148. This will reverse the direction of rotation of gear 148 and pulley 94, so that these members will now rotate clockwise to wind the cable 86 on said pulley.

A double ratchet wheel 150 (see Fig. 8) is mounted on shaft 144 adjacent bearing 146, and a lever 152 is pivotally connected at 154 to bearing member 146, said lever having attached thereto a pair of depending extensions 156 and 157 on opposite sides of the pivot pin 154. A pair of pawls 158 and 159 are each attached to the lower ends of extensions 156 and 157, respectively, and are each pivotally connected at 160, at one end, to bearing member 146. The free end of pawl 158 makes contact with the teeth 162 on one side of the ratchet wheel on clockwise rotation of lever 152, said teeth facing in a counterclockwise direction so that engagement of pawl 158 with said teeth prevents counterclockwise rotation of shaft 144 and pulley 94. The free end of pawl 159 makes contact with the teeth 164 on the other side of ratchet wheel 150 when lever 152 is pivoted counterclockwise, teeth 164 facing in a clockwise direction so that engagement of pawl 159 therewith prevents clockwise rotation of shaft 144 and pulley 94. It is seen that when pawl 158 is in contact with the ratchet wheel 150, pawl 159 is free from contact therewith, and vice versa. Also, both pawls can be lifted free of wheel 150.

Mercury switch 54 controls motor 96 through a circuit (see Fig. 7) including, in series, switch 102, a relay 166, and a battery 168. Switch 54 is connected to switch 102 through leads 64 and 112, connected together by lead 170, and switch 54 is connected to one side of the battery 168 by lead 62. The relay 166 comprises a switch arm 172 connected at one end to a spring 174 in turn attached to a stationary member 176, the other end of arm 172 having a cross contact 178 connected thereto. A coil 180 is disposed about arm 172, the coil being connected at one end to lead 113 and at the other end to a lead 181, in turn connected to the other side of battery 168.

When switches 54 and 102 are closed and the relay 166 is energized, switch arm 172 moves to bring contact 178 into engagement with terminals 182 to close a circuit to the motor, said circuit including, in addition to terminals 182, leads 184 and 186, the latter being connected to the motor, and leads 188 and 190, the latter being connected to the motor. Leads 188 and 190 are connected to a source of electrical energy 192 for operation of the motor. A lead 194 is connected in parallel in this circuit across leads 184 and 188, a manual switch 196 being disposed between leads 184 and 194. It is thus seen that when relay 166 is open, the motor 96 can nevertheless be placed in operation by closing the manual switch 196. When switch 196 is open, the motor will only operate if both switches 54 and 102 are closed.

In employing the above-described novel apparatus for carrying out the inventive procedure, it is first determined what the desired depth of etch is to be given the work piece 16. Since this same depth of etch will be imparted to the exposed surface 22 of the sample piece 14 for a given etch period in the etching solution 12 (assuming the conditions of etching such as concentration and temperature of the solution in the proximity of both the work piece and sample are the same), knowing the area of the surface 22 of the sample to be exposed to the etching solution, the amount of metal which will be dissolved from the sample by etching during this period can be calculated. This portion of metal which will be eaten away from the sample by etching will result in the generation of a specific amount of gas, which can also be calculated. From this knowledge of the amount of gas, e. g., hydrogen, which will be generated by etching of sample piece 14 to the desired depth, the position of the counter weight 50 can be adjusted along the beam 40 to offset the buoyancy of this gas, so that when both the sample and work piece have been etched to the desired depth, the generation of any additional gas will cause the counterweight to overbalance the bell and rotate the beam 40 clockwise, lifting the bell in the solution until the beam has rotated sufficiently to actuate mercury switch 54.

The bell 41 supported on rod 43 is then immersed in the etching solution with its open end downward, and the counterweight 50 is adjusted to the desired position along beam 40, as described above. The sample 14 is then fitted carefully into the aperture 18 of the holder 20, with the exposed surface 22 of sample 14 flush with the adjacent surface 23 of holder 20. The holder containing sample piece 14 is positioned at one end of platform 24, and the platform supported by rod 25 is then immersed in the etching solution so that the exposed surface 22 of the sample is positioned directly below the open end 41' of the bell.

The work piece 16 held by the clamp 76 is placed in the solution practically simultaneously with the sample piece 14 and in proximity thereto, so that etching of both the work piece and sample commence at the same time and proceed at the same rate. The sample piece and work piece are now in position for etching as seen in Fig. 1, with the bell 41, beam 40, counterweight 50 and switch 54 in their respective positions as illustrated particularly in Figs. 1, 2, and 4. The work piece is conducted into the solution by rotating the lever 152 counterclockwise to disengage pawl 158 from the teeth 162 of the ratchet wheel 150, shifting lever 136 to place gear 124 in engagement with gears 122 and 148, as shown in Fig. 7, for counterclockwise rotation of pulley 94 by the motor, and closing the manual switch 196 to energize the motor. When the proper amount of cable 86 has been unwound to immerse the work piece 16 to the desired depth in the etching solution, the switch 196 is opened to cut the motor, and lever 152 is actuated to place pawl 158 in contact with teeth 162 of the ratchet wheel to prevent further unwinding of the cable during the etching period.

Lever 136 is then pivoted counterclockwise to shift gear 126 into contact with gears 122 and 148, so that subsequent actuation of the motor will cause rotation of pulley 94 clockwise to wind cable 86 thereon. In the event too much cable is unwound during the process of placing the work piece in the etching bath 12, step 98 will abut the arm 100 on bracket 90, preventing further unwinding of the cable. While work piece 16 is being conducted into the etching solution and during the etching period, mercury switch 54 is open as seen in Fig. 4, so that the relay 166 remains unenergized. Also, while the work piece is being placed in the solution, or during the etching period, switch 102 is closed by pivoting arm 108 counterclockwise, so that the contacts 104 and 106 are touching.

During the etching period, the gas generated, i. e., hydrogen where an aluminum work piece is being etched in an alkali solution, rises into the top of the bell 41, displacing the liquid therein. When the work piece 16 and the sample piece 14 have been etched to the desired depth, the amount of gas 195 generated by the sample and captured in the bell 41 will exert sufficient upward force due to the buoyancy of the hydrogen to cause the counterweight 50 to rotate the beam 40 clockwise as illustrated in Fig. 14, at the same time lifting the bell 41 in the solution. Any minor amount of additional gas liberated from sample piece 14 will cause further rotation of the beam 40 to the dotted line position shown in Fig. 2. When the beam has thus rotated to the aforementioned position, mercury switch 54 will be inclined in the position shown most clearly in Fig. 3, thus closing the switch. Since switch 102 is also closed at this point, the relay 66 will be energized, bringing contact member 173 thereof into engagement with contacts 182 to close the circuit to the motor. Actuation of the motor then causes the pulley 94 to rotate clockwise, winding the cable 86 onto this pulley and rapidly lifting the work piece from the etching solution to prevent further attack thereof by the solution.

During this operation, when the stop 98 strikes switch arm 108 as the stop moves with the cable toward pulley 94 (see Fig. 1), arm 108 will be pivoted clockwise out of engagement with the fixed contact 104 to its dotted line position, opening the circuit to the motor and shutting it off. In the event it is desired to prevent further winding of the cable on pulley 94, and as an added safety measure, lever 152 can be actuated to place pawl 159 in contact with teeth 164 of the ratchet wheel, preventing further clockwise rotation of pulley 94. When the pulley 94 and cable 86 have come to rest, however, lever 152 is shifted to bring pawl 158 in contact with the ratchet wheel and disengage pawl 159 therefrom to prevent unwinding of the cable due to the weight of the clamp 76 and the work piece supported thereby. The etched work piece is then removed from said clamp.

The above described operation can then be repeated, using a new work piece and sample.

It is noted that, through the use of the switch 54 and an electrical circuit such as that shown and described above for actuation of the motor, there is a minimum time delay between the actuation of switch 54 and the operation of the motor, and the motor thus set into operation rapidly lifts the work piece from the solution. Accordingly, after actuation of switch 54 to signal attainment of the predetermined depth of etch on the work piece, the work piece is withdrawn from the solution before any significant amount of further etching can take place on the work piece.

It is to be understood, of course, that instead of employing the sensing device or switch 54 to actuate mechanism for lifting the work piece from the solution, actuation of this switch or an equivalent sensing device can be employed to initiate any other desired action with respect to the work piece when a predetermined depth of etch has been attained, e. g., the start of an additional etching period.

Further, it is to be understood that the sample piece 14 itself can be the work piece which it is desired to etch to a determined depth. Thus, when the amount of gas corresponding to this depth of etch is generated by etching of such work piece, mechanism can be provided which will be actuated by switch 54 or an equivalent sensing means to lift the work piece from the etching solution, or initiate any other action with respect to said work piece.

By proper adjustment of the sensitivity of the balance and of the response of the apparatus, the time lag of the functioning of the apparatus can be reduced so that the depth of etch in the work piece between the time when the beam is actuated and the time of withdrawal of the work piece may be reduced to insubstantial proportions as will be understood in the art.

While I have described a particular embodiment of my invention for the purpose of illustration, it should be understood that various modifications and adaptations thereof may be made within the spirit of the invention as set forth in the appended claims.

I claim:

1. The method of indicating a predetermined depth of material removal from a work piece by chemical etching in an etching solution, which comprises placing a sample of the same material as said work piece adjacent thereto in said solution, said sample generating a gas during etching thereof in said solution, exposing a predetermined area of said sample to etching in said solution under the same conditions as said work piece, generating a gas in the etching reaction, and etching said work piece and said exposed area of said sample for a period sufficient to generate from said sample a preselected amount of said gas corresponding to a predetermined depth of material removal from said sample, equal to said predetermined depth of material removal from said work piece.

2. The method of chemically etching to a predetermined depth on the metal surface of a work piece, which comprises immersing a sample of the same material as said metal surface to be etched in an etching solution, said sample generating gas during etching thereof in said solution, immersing said work piece in said solution adjacent said sample, exposing a predetermined area of said sample to etching in said solution under the same conditions as said work piece, generating a gas in the etching reaction, etching said work piece and said exposed area of said sample for a period sufficient to generate from said sample a preselected amount of said gas corresponding to a predetermined depth of etching of said sample, equal to said predetermined depth of etching of said work piece, and sensing the completion of generation of said preselected amount of gas.

3. The method of chemically etching to a predetermined depth on the metal surface of a work piece, which comprises immersing a sample of the same material as said metal surface to be etched in an etching solution, said sample generating gas during etching thereof in said solution, immersing said work piece in said solution adjacent said sample, exposing a predetermined area of said sample to etching in said solution under the same conditions as said work piece, generating a gas in the etching reaction, collecting said gas, etching said work piece and exposed area of said sample for a period sufficient to collect a preselected amount of said gas generated from said sample corresponding to a predetermined depth of etching of said sample, equal to said predetermined depth of etching of said work piece, sensing the completion of collection of said preselected amount of gas and removing said article from said solution in response to said sensing.

4. The process as described in claim 3, wherein said sensing is electromechanical.

5. A device for obtaining a predetermined depth of material removal from an article by chemical etching in an etching solution, which comprises a tank for said solution, a support for said article, a container mounted in said tank above said support, said container having an opening for the introduction therein of gas generated from said article during etching, a support for said container and means for sensing the quantity of gas introduced in said container.

6. A device for obtaining a predetermined depth of material removal from an article by chemical etching in an etching solution, which comprises a tank for said solution, a support for said article, a container mounted in said tank above said support, said container having an opening in its bottom for the introduction into said container of gas generated from said article during etching, said container being closed at the top, a support for said container, and means for sensing the buoyancy of said container due to the gas introduced therein.

7. A device for obtaining a predetermined depth of material removal from a work piece by chemical etching in an etching solution, which comprises a tank for said solution, a support for a sample piece, a container mounted in said tank above said support, said container having an opening for the introduction therein of gas generated from said sample piece during etching, a support for said container, a support for said work piece, means for moving said last named support into and out of said tank, and means for actuating said moving means in response to the introduction of a preselected quantity of gas from said sample piece in said container.

8. A device for obtaining a predetermined depth of material removal from a work piece by chemical etching in an etching solution, which comprises a tank for said solution, a support for a sample piece, a container mounted in said tank above said support, said container having an opening for the introduction therein of gas generated from said sample piece during etching, a support for said container, means for sensing the introduction of a preselected quantity of gas in said container, a support for said work piece, means for moving said last named support into and out of said tank, and means for actuating said moving means in response to operation of said sensing means.

9. A device for obtaining a predetermined depth of material removal from a work piece by chemical etching in an etching solution, which comprises a tank for said solution, a support for a sample piece, a container mounted in said tank above said support, said container having an opening in its bottom for the introduction into said container of gas generated from said sample piece during etching, said container being closed at the top, a support for said container, means for sensing the buoyancy of said container corresponding to the introduction of a preselected quantity of gas from said sample piece in said container, a support for said work piece, means for moving said last named support into and out of said tank, and means for actuating said moving means in response to operation of said sensing means.

10. A device for obtaining a predetermined depth of etch on a work piece by chemical etching in an etching solution, which comprises a tank for said solution, a support for a sample piece, a container mounted in said tank above said support, said container having an opening for the introduction therein of gas generated from said sample during etching, a support for said container, a beam, said container support being connected to said beam, said beam being pivoted intermediate its ends, means for causing rotation of said beam in response to the buoyancy of said container due to the gas introduced therein, means for sensing an amount of beam rotation in response to buoyancy of said container due to the introduction of a preselected quantity of gas in said container, a support for said work piece, means for moving said last named support into and out of said tank, and means for actuating said moving means in response to operation of said sensing means.

11. A device for obtaining a predetermined depth of etch on a work piece by chemical etching in an etching solution, which comprises a tank for said solution, a support for a sample piece, a container mounted in said tank above said support, said container having an opening for the introduction therein of gas generated from said sample during etching, a support for said container, a beam, said container support being connected to said beam, said beam being pivoted intermediate its ends, means on said beam for causing rotation thereof in response to the buoyancy of said container due to the gas introduced therein, switch means for sensing an amount of beam rotation in response to a buoyancy of said container due to the introduction of a preselected quantity of gas in said container, a support for said work piece, means for moving said last named support downwardly and upwardly in said tank, and means responsive to actuation of said switch means for operating said moving means to move said work piece support upwardly in said tank.

12. A device for obtaining a predetermined depth of etch on a work piece by chemical etching in an etching solution, which comprises a tank for said solution, a support for a sample piece, a container mounted in said tank above said support, said container having an opening in its bottom for the introduction into said container of gas generated from said sample piece during etching, said container being closed at the top, a support for said container, a beam, said container support being connected to said beam near one end thereof, said beam being pivoted intermediate its ends, a counterweight on said beam for causing rotation thereof in response to the buoyancy of said container due to the gas introduced therein, a switch on said beam for sensing an amount of beam rotation in response to a buoyancy of said container due to the introduction of preselected quantity of gas in said container, a movable support for said work piece, a motor, said motor being connected to said last named support to control movement thereof downwardly and upwardly in said tank, an electrical circuit, said switch and motor being connected in said circuit, and said circuit actuating said motor for movement of said work piece support upwardly in said tank on actuation of said switch.

13. A device for obtaining a predetermined depth of material removal from an article by chemical etching in an etching solution, which comprises a tank for said solution, a support for said article, means for collecting gas generated from said article during etching, and means for sensing a preselected quantity of gas collected in said first mentioned means produced by etching of said article to said predetermined depth.

14. A device for obtaining a predetermined depth of material removal from a work piece by chemical etching in an etching solution, which comprises a tank for said solution, a support for a sample piece, means for collecting gas generated from said sample during etching, a support for said work piece, means for moving said last named support, and means for actuating said moving means in response to the introduction of a preselected quantity of gas from said sample piece in said gas collecting means, produced by etching of said sample to a depth equal to said predetermined depth of material removal from said work piece.

References Cited in the file of this patent

UNITED STATES PATENTS

| | | |
|---|---|---|
| 2,067,290 | Robertson | Jan. 12, 1937 |
| 2,416,716 | Ross | Mar. 4, 1947 |
| 2,621,671 | Eckfeldt | Dec. 16, 1952 |
| 2,762,036 | Triman | Sept. 4, 1956 |